United States Patent [19]
Smith

[11] Patent Number: 5,732,267
[45] Date of Patent: Mar. 24, 1998

[54] CACHING/PREWARMING DATA LOADED FROM CD-ROM

[75] Inventor: Matthew W. Smith, Tulsa, Okla.

[73] Assignee: Microsoft Corporation, Redmond, Wash.

[21] Appl. No.: 510,261

[22] Filed: Aug. 2, 1995

[51] Int. Cl.$^6$ ................................................. G06F 13/10
[52] U.S. Cl. ................................................. 395/651
[58] Field of Search ................................. 395/651, 842

[56] References Cited

U.S. PATENT DOCUMENTS

| | | | |
|---|---|---|---|
| 5,261,072 | 11/1993 | Siegel | 395/842 |
| 5,577,224 | 11/1996 | Dewitt et al. | 395/445 |
| 5,604,906 | 2/1997 | Murphy et al. | 395/712 |
| 5,664,224 | 9/1997 | Davis | 395/842 |

OTHER PUBLICATIONS

Mallory, Zin, New for PC: Lightening Cache Program for Windows, Sep. 29, 1992, 1.
The Seybold Report, PC Dis10 Cache, Jul.6, 1992, 3.

Primary Examiner—Kevin A. Kriess
Assistant Examiner—John Q. Chavis
Attorney, Agent, or Firm—Ronald M. Anderson

[57] ABSTRACT

Data defining pages and objects of a multimedia work are transferred in the background to minimize delays that would otherwise be incurred. In playing a multimedia work that is recorded on a CD-ROM, a personal computer (10) that includes a central processing using (CPU) (23) transfers data for selected pages and for objects on a page of the multimedia work into a cache, using free CPU cycles, so that the data are available when needed. This technique is particularly useful in transferring data for animation objects of a multimedia work, since it enables two animations to play concurrently without incurring a delay to load the data for the second animation when the page is loaded and avoids interrupting the execution of the first animation at the time that the second animation must start executing. An authoring program used to create the multimedia work enables the author to select the pages and objects on a page that are to be prewarmed in this manner.

40 Claims, 7 Drawing Sheets

TITLE CACHE SPECIFICATION

MINIMUM FREE MEMORY (%): -1  192
MINIMUM FREE GDI (%): -1  182
MAXIMUM CACHED OBJECTS: 10  184
MAXIMUM CACHED PAGES: 2  186
PREWARMING ON: X  188  190

OK
CANCEL  194

FRAME BUFFERING/PURGING

BUFFER
202 — ○ ON LOAD
204 — ● ON PLAY
206 — ○ STREAM
208

PURGE
210 — ○ NONE
212 — ○ EACH
214 — ● AT END
216

218 OK    220 CANCEL

CACHING/PREWARMING DATA LOADED FROM CD-ROM

FIELD OF THE INVENTION

This invention generally pertains to a method and system for transferring stored data, and more specifically, to transferring data to a computer random access memory (RAM) from a compact disk-read only memory (CD-ROM).

BACKGROUND OF THE INVENTION

The term "multimedia" as used herein refers to computer programs that combine audio and visual components in a single work. These components can be in the form of videos that run in a window on the computer display screen, animations, still images (photographic or computer generated), Red Book audio (sound in conventional music or audio CD format), wave files (*.WAV) (digitized sound), and/or musical instrument digital interface (MIDI) files, which are used to produce music or other sounds by controlling a sound board in the computer, external music synthesizer, or other hardware. Multimedia components can be combined in unlimited ways by an author to create many different types of works; such works are typically intended for educational and/or entertainment purposes.

Because a single multimedia work often includes hundreds of megabytes of data, the current most popular storage and distribution medium for such works is the CD-ROM. Although the CD-ROM is ideal for storing large amounts of data, it has significant speed limitations in accessing that data. The "seek" time of a CD-ROM, which is the time needed for the read head in the drive to move from one track position to access data stored in another track, is the most significant limitation of this type of storage medium. The seek time inherently determines at least a portion of the time required to load or transfer data from the CD-ROM disk into the memory of the computer. Admittedly, the data transfer rate of CD-ROM drives continues to improve, as evidenced by the growing availability of 6X-speed drives; however, the seek time has not so dramatically improved. Even the faster 6X-speed drives now available are faced with the same mechanical limitations in moving the read head to access data recorded on different tracks of the CD-ROM.

One way to minimize delays caused during playback of a work recorded on a CD-ROM is to load all of the data required for all objects of the portion of the multimedia work that is to be played into the RAM of the computer before that portion is executed by the computer's processor. Unfortunately, the time required to load a large amount of data before starting to play the portion of the work can be several seconds. To a user, a wait of several seconds before a selected portion of the work begins to execute on the computer can seem an unacceptably long time. If all of the data for an object is not loaded into the computer's RAM until the time that the object is required to be executed, there will be a delay in the execution of that portion bf the multimedia work while the data for the object loads. For example, if the portion of the multimedia work that is playing includes multiple animations that start at different times but run concurrently, the first animation will be interrupted while the data for the second animation are loaded into memory. Clearly, this method of loading object data into computer memory from a CD-ROM is unacceptable.

However, the delay that results from loading all of the data for all of the objects on a portion of a multimedia work before that portion starts to execute can disrupt the smooth transition between successive portions of the work. As more objects are used in the portion of the work that is played next, the total seek time required to access all of the data representing those objects on a CD-ROM increases, causing a delay thatis more evident. It should therefore be evident that a different approach is required for loading the data stream corresponding to the objects and the data needed to start successive portions into computer RAM from a CD-ROM.

SUMMARY OF THE INVENTION

In accordance with the present invention, a method for transferring data from a storage medium to the memory of a computer is defined. In this method, the data required to execute an integral task are divided into related but discrete portions that a central processor of the computer starts to use at different times in implementing the task. The method includes the steps of transferring a first discrete portion of the data that will be used by the computer from the storage medium to the memory of the computer. Before the central processor of the computer begins to use the first discrete portion of the data, and during any times when the central processor of the computer would otherwise be inactive, the second discrete portion of the data that will subsequently be used by the computer is transferred from the storage medium to the memory of the computer. Thus, at least part of the second discrete portion of the data is transferred to and stored in the memory of the computer for use when needed to perform the integral task, without interrupting other tasks that the central processor is performing.

Further, the memory of the computer comprises a cache that includes a demand section and an optional section. The demand section is initially loaded with data that the central processor will need to begin using the first and second discrete portions of the data and the optional section is loaded with at least a portion of the second discrete portion of the data. The second discrete portion of the data is subsequently shifted from the optional section into the demand section after the central processor begins to use the first discrete portion of the data. The demand section can exceed the maximum size of the cache set by the user, if required to load data needed by the central processor to use the discrete portions of the data.

A user is enabled to specify the discrete portions of the data that will be loaded into the computer memory when the central processor is otherwise free. The discrete portions of the data that can be loaded when the central processor is free preferably define at least one of a page and an object of a multimedia work stored on a CD-ROM. Also, the steps of transferring the data preferably comprise the steps of reading the discrete portions of the data for the at least one of the page and the object from the CD-ROM, and transferring the discrete portions of the data into a cache accessible by the central processor.

Another aspect of the present invention is directed to a system for transferring discrete portions of data from a storage device, so as to minimize delays in using other discrete portions of data. This system includes a computer that uses the portions of data; different discrete portions of the data are used by the computer at different times. The computer includes a central processor that executes machine instructions to carry out functions performed by the computer, and a memory that is used to store data for programs executing on the computer and to store the machine instructions that control the computer. An interface couples the computer to the storage device, enabling the computer to access and transfer the discrete portion of the data from the storage device to the memory. The central processor responds to machine instructions that cause one discrete portion of the data to be transferred to the memory during free central processor cycles, so that other tasks being implemented by the central processor are not interrupted or delayed during the transfer of data. In this manner, the central processor "prewarms" the discrete portion of the data that is transferred in the background, so it is subsequently available for use by the central processor when needed. The components of the system generally implement functions that are consistent with the steps of the method discussed above.

Still another aspect of the present invention is directed to an article of manufacture that includes a memory medium on which are stored a plurality of machine instructions that execute on a computer. When implemented on a computer, the machine instructions provide for controlling the transfer of data from a storage device into the memory of the computer, generally as described above, in connection with the method. Other functions provided by the machine instructions are generally consistent with the steps of the method.

Yet other aspects of the invention are directed to a method for storing data and to an article of manufacture that includes machine instructions for storing data. The data are transferred from a storage device to a cache in the memory of a computer. The steps and functions defined in regard to these aspects of the invention are generally consistent with the description of the caching of data in a demand section and in an optional section of the cache, as noted above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
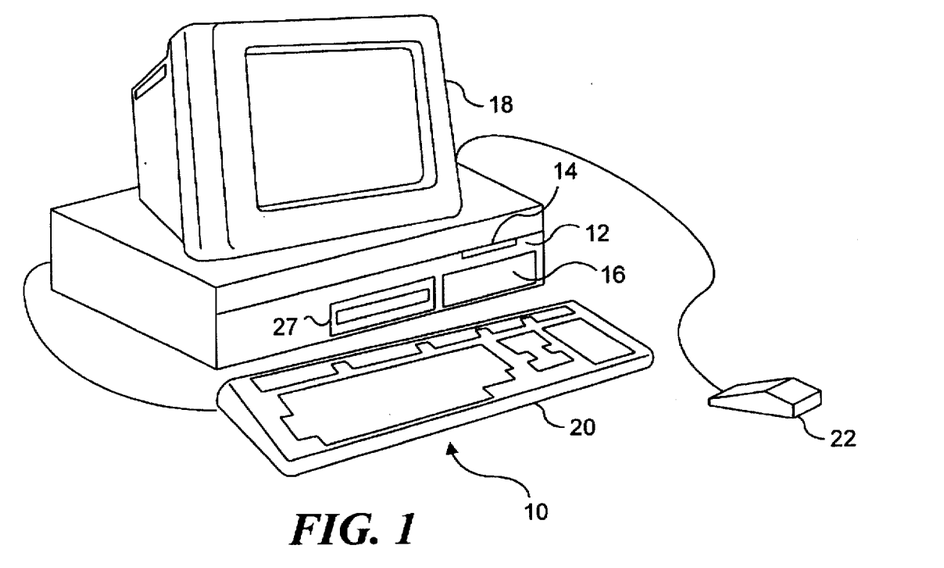
FIG. 1 is a personal computer system appropriate for implementing the present invention.

The present invention is intended to be implemented on a personal computer 10, such as that shown in FIG. 1. Personal computer 10 is generally conventional in design, including a processor chassis 12 in which is disposed a 3½-inch floppy disk drive 14 and a hard drive 16. Both floppy disk drive 14 and hard drive 16 are used for storing executable files and data files, the floppy disk drive enabling those files to be transported, e.g., between personal computer 10 and another computer (not shown). In addition, personal computer 10 inchdes a monitor 18, which is preferably capable of graphic resolutions of at least 640×480 pixels, at 256 colors. A keyboard 20 and a mouse 22 are coupled to the personal computer to enable the user to control applications executing on the computer and to provide alphanumeric and graphically selected input to such programs. Personal computer 10 is a multimedia-type computer, including an internal sound card (not shown in FIG. 1) and a CD-ROM drive 27.

Figure 2:
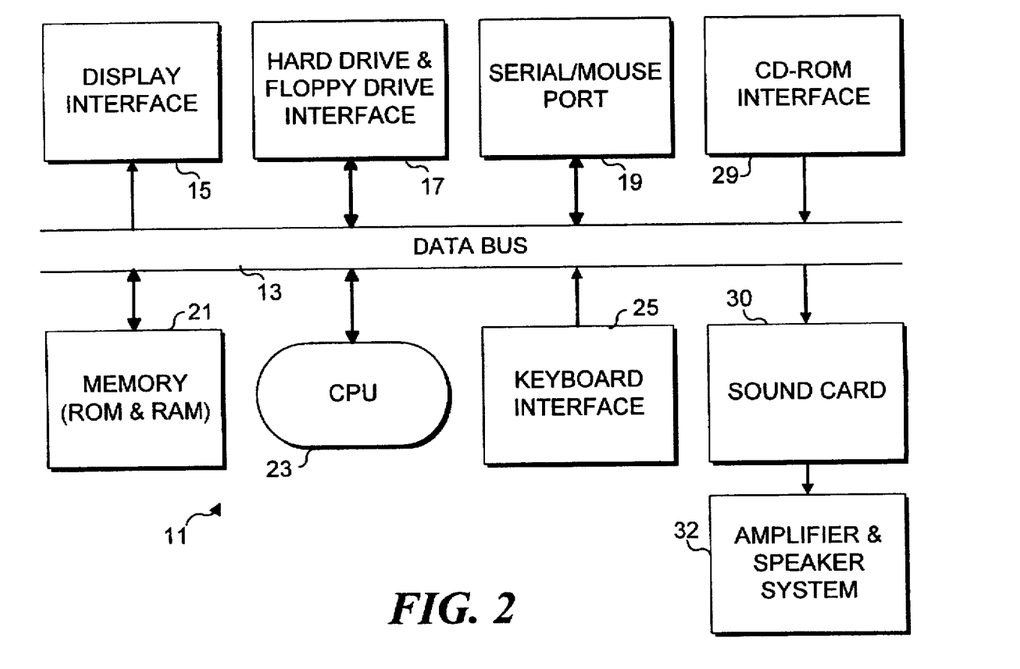
FIG. 2 is a block diagram of the internal components of the personal computer system involved with implementing the present invention.

Internal components of processor chassis 12 are illustrated in FIG. 2, in a block diagram 11. Inside processor chassis 12 is disposed a central processing unit (CPU) 23 that is coupled to a data bus 13. The data bus provides bi-directional communication of data and control instructions between CPU 23 and other components. Coupled to data bus 13 are a display interface 15 for driving monitor 18, a hard drive and floppy drive interface 17 for controlling hard drive 16 and floppy disk drive 14, a serial/mouse port 19, a CD-ROM interface 29 for controlling the CD-ROM drive, a memory 21 that includes both read only memory (ROM) and random access memory (RAM), a keyboard interface 25, and a sound card 30. An amplifier and speaker system 32 is coupled to sound card 30, enabling the user to play MIDI files, wave files, and Red Book audio stored on a CD-ROM disk that is inserted into the CD-ROM drive. Further details of personal computer 10 and its internal components need not be further described, since multimedia-type personal computers suitable for use in connection with the present invention are well known to those of ordinary skill in the art.

When implementing a preferred embodiment of the present invention to enable data to be more efficiently transferred from a CD-ROM to memory 21, CPU 23 executes a run time version of a multimedia work authoring program developed for Microsoft Corporation that is referred to by the trademark SYMMETRY™. The full authoring (edit) SYMMETRY program enables an author to produce a multimedia work that is initially stored on hard drive 16 and subsequently transferred to a master CD-ROM disk. The run time version of the SYMMETRY program is a simple subset of the full version that does not include menus or a toolbar and is used to play the multimedia work created with the full version.

The SYMMETRY program (either version) is intended to run under a graphic user interface, such as Microsoft's WINDOWS™ operating system. It is contemplated that the present invention will also be implemented on other types of computers and under other types of graphic operating systems, such as Apple's SYSTEM7™. Although the SYMMETRY program is specifically written for creating and running multimedia works, in a broader sense, the present invention that is implemented by the SYMMETRY program can be employed for more efficiently transferring other types of data that are not part of a multimedia work. The invention could also be implemented in a non-graphic user environment, for example, under MS-DOS or a UNIX operating system. Furthermore, the present invention can be incorporated in other types of applications, running on almost any type of computer or workstation.

A primary feature of the present invention is its ability to transfer data in the background by "stealing" available CPU cycles. Thus, during times when CPU 23 is not being used for other tasks, it is employed to transfer data from a CD-ROM into the RAM of memory 21, so that the data are immediately available when needed. In the preferred embodiment, the data stored on the CD-ROM define a plurality of objects that comprise a multimedia work. The invention is used to minimize delays and interruptions that would otherwise be incurred to transfer the data from a CD-ROM on which the data are stored while the multimedia work is being run by a subsequent user.

When a multimedia work is produced by an author using the authoring SYMMETRY program, personal computer 10 is used by the author to create, edit, and assemble the various objects comprising successive pages of the multimedia work. As the multimedia work is created, the data defining it are stored on hard drive 16 for subsequent use in creating a CD-ROM master that will be used for publishing the work by producing multiple copies of the CD-ROM for distribution to the end users. Each of these copies is intended to be run on a multimedia machine such as personal computer 10, having the capability to display the objects on monitor 18 and to play sound objects through sound card 30. The personal computer used to play the multimedia work is generally equivalent to that used to create the work. In other words, personal computer 10 is an example of a computer that can serve both of these purposes.

A typical multimedia work includes a number of pages. Each page reflects a different subsection of the work generally corresponding to a different screen or scene—much like the pages in an artist's sketch book. A page includes at least one object, but typically comprises several objects, including visually perceptible objects that may appear in different windows of the display on monitor 18. In addition, a page may include one or more audio objects. A plurality of image frames and one or more sounds typically comprise an animation object. Since several Kbytes of data are often required to define each image frame of an animation or a video, a substantial amount of data must be stored on the CD-ROM and transferred into the memory of the personal computer to play an animation or video. Although not limited to transferring the data required for playing animations or videos, the present invention is particularly helpful in enabling animations or videos incorporated in a multimedia work to run without incurring any perceived delay to load the data defining the animation, video, or other type of object into the memory of the personal computer from the CD-ROM before the object is required to play on a page.

Figure 3:
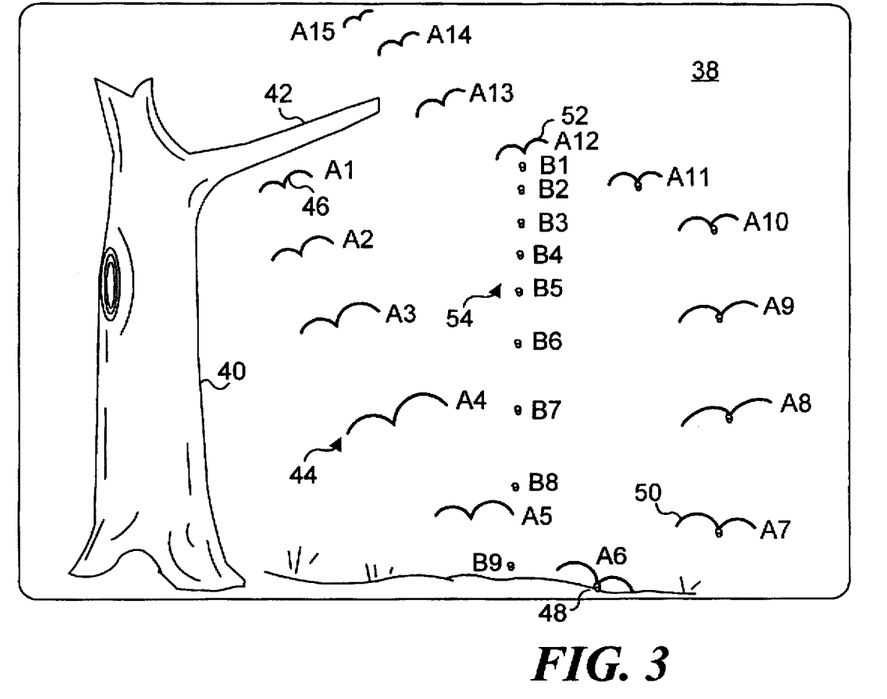
FIG. 3 is an exemplary screen display illustrating the sequential running of two animation objects in a multimedia work.

Before a page of a multimedia work can be opened or displayed on the monitor, at least sufficient data to instantiate each of the objects comprising the page must be transferred from the CD-ROM to the computer RAM. If all of the data for all objects on the page are transferred into memory at that time, there will be no delay in executing each object of the page. However, if the page includes a number of objects or if a large amount of data is required to execute the objects on a page, an unacceptably long delay may be incurred to load the data before the page initially appears on the monitor. To minimize this delay, only the portion of the data required to instantiate each object on the page before the page appears on the monitor can be initially loaded, the remaining portion being transferred into memory from the CD-ROM at the time each object is required to execute or play. However, a significant problem can arise because of the delay incurred to load the remaining portions of the data required to execute each object. This problem is most apparent when multiple animations are run that start at different times, but are concurrent. FIG. 3 simplistically illustrates the problem that can arise in this case.

FIG. 3 shows a page or screen 38 on which two animations are run. In this example, a first animation 44 starts as a bird 46 flies from a limb 42 of a tree 40. First animation 44 is represented in FIG. 3 as a series of frames in which the bird successively moves to positions designated A1 through A15. When the first animation executes, only one position is shown in each frame, but to illustrate the problem, all of the positions are shown in the figure in the order in which they are displayed sequentially in time. At position A1, for example, bird 46 has left limb 42 and begun to fly down toward an acorn 48 that is lying on the ground. Positions A2 through A5 show bird 46 in successive flames as it approaches acorn 48. At position A6, the bird has picked up the acorn and is flying away with it, as subsequently shown in positions A7 through A11. In position A12, the bird has dropped the acorn. At this time, a second animation 54 begins to play. The second animation inchdes frames in which the acorn is shown at positions B1 through B9 that occur over successive intervals of time, as the acorn falls to the ground. Starting at position A12 and continuing through position A15, after dropping the acorn, the bird is shown as it continues to fly away.

The problem discussed above manifests itself in a delay that is normally incurred to load the data necessary for second animation 54. While the data for the second animation that shows the acorn falling are being loaded into RAM from the CD-ROM, bird 46 will pause at position A12, because the CPU is busy loading the data. This pause will interrupt the running of first animation 44 while the data for second animation 54 transfers from the CD-ROM into RAM. Once the data for second animation 54 are loaded into RAM, bird 46 will again start flying away, as shown in positions A13 through A15, while acorn 48 falls to the ground at a much higher frame rate, as shown in positions B1 through B9. The interruption in first animation 44 that occurs while the data loads for the second animation is clearly objectionable, and can be avoided by employing the present invention.

Figure 4:
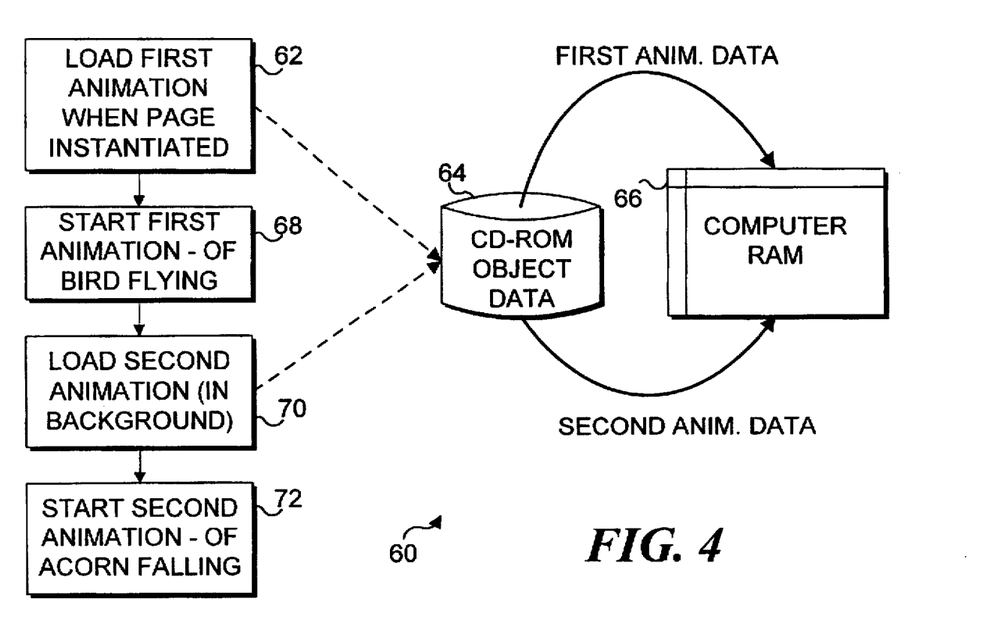
FIG. 4 is a block diagram that shows how the present invention is used to more efficiently load data for a second animation while a first animation is executing.

FIG. 4 illustrates the steps required generally to implement the present invention so that the data for second animation 54 can be loaded prior to the play of the first animation, and therefore without disrupting the running of first animation 44. As shown in a block diagram 60, a block 62 provides for loading the first animation when the page is originally instantiated for display on the monitor. At this time, the data for the first animation object are transferred from a CD-ROM 64 into RAM 66 of the personal computer so that the first animation can be initiated when needed in the multimedia work. In a block 68, during free cycles of the CPU, i.e., during time that the CPU is available because it is not required for implementing any other tasks, the second animation loads into RAM. The loading of the second animation may occur in the background at anytime before the first animation starts playing. In a block 70, the first animation begins playing. At position A12 in the first animation, the data required for the second animation object is already loaded, having been transferred from CD-ROM 64 into RAM 66 before the first animation started playing, so that in a block 72, the second animation can start without delaying or interrupting the first animation.

Figure 5:
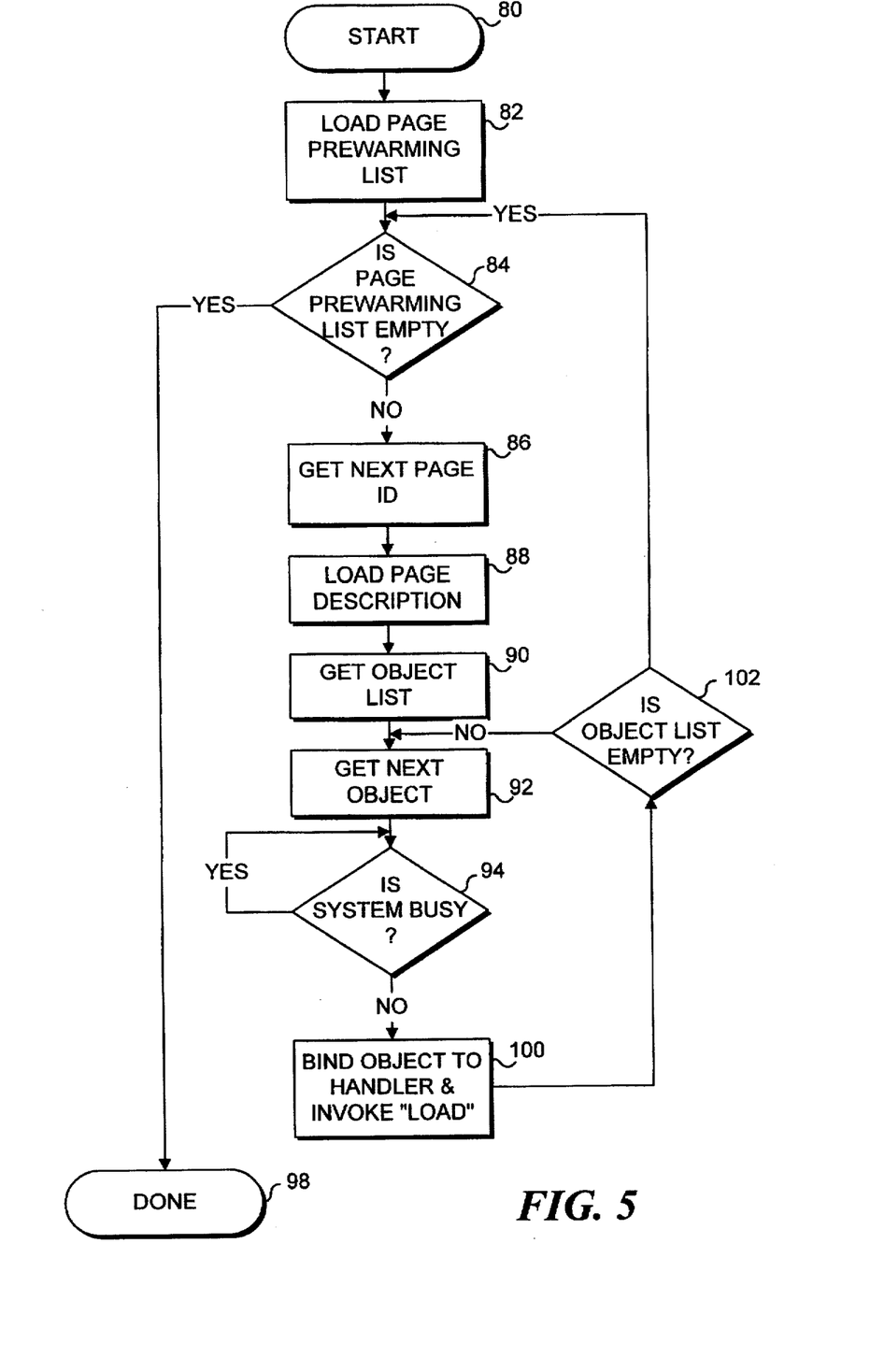
FIG. 5 is a flow chart showing the logical steps effected in "prewarming" the data for a page.

In the preferred embodiment of the present invention, the loading of data for a page or an object during available free cycles of the CPU is referred to as "prewarming." The steps involved in prewarming a page when the multimedia work is played are illustrated in FIG. 5, beginning at a start block 80. In a block 82, the CPU in personal computer 10 that is playing a multimedia work loads a page prewarming list that is associated with a page that is being loaded. For example, a page that introduces a subsection of a multimedia work may have associated with it a page prewarming list that indicates each of the pages in the subsection that the author has specified for prewarming. It is important to note that prewarming of a page or an object can only occur if the CPU executing the multimedia work is not otherwise busy, since virtually every other aspect of executing the work has a higher priority. The steps illustrated in FIG. 5 take place while a current page of the multimedia work is loading, provided that the author of the work has enabled prewarming.

In a decision block 84, the logic determines if the page prewarming list is empty. In other words, it determines whether all pages in the current page prewarming list that were selected for prewarming by the author of the multimedia work have been prewarreed. If not, a block 86 gets the page ID for the next page that is to be prewarmed. When a page is prewarmed, the page description for that page, which is identified by the page ID, is loaded into RAM, as indicated in a block 88. The page description is a data structure that describes certain attributes of the page, including its color, its transition effect (i.e., fade, wipe, etc.), and the identifiers and activation data for each object that will be associated with the page. After the page descriptor is loaded, each of the objects associated with the page by virtue of having been registered with the page descriptor, is obtained from an object list, as indicated in a block 90. In accord with a block 92, each such object in turn is read from the object list. A decision block 94, which is inserted at this point in the flow chart, is intended to remind that the page prewarming process can only proceed when the system is not otherwise busy. The next step of the page prewarming process in a block 100 is to bind the current object to an appropriate handler and give the object a "load" invocation. A decision block 102 determines whether the object list is empty, and if not, the next object is obtained. When the page descriptor has been loaded and each of the associated objects on the page has been bound and invoked to load, the page is considered to be fully prewarreed. The system then moves on to prewarm the next page in the page prewarming list, by returning to decision block 84. After all of the pages in the page prewarming list are processed, the procedure terminates in a block 89.

Preferably, before any pages specified for prewarming have been prewarmed (and assuming that prewarming is selectively enabled by the author), the system begins to invoke prewarming of objects on the current page. Objects that are to receive the prewarm invocation must already be "loaded." For example, an object may have been loaded because it was active on another page that was prewarmed, or it may have been cached from a previous page (assuming that caching is enabled), or it may have been loaded when the current page was loaded. In any event, in the preferred embodiment of the present invention, an object cannot receive a prewarm invocation unless the object has already been instantiated on the active page. It should also be noted that if prewarming is enabled, each of the objects on the active page will receive the prewarm invocation regardless of whether the active page has a page prewarm list associated with it.

For many objects, the prewarm invocation has no effect, because the object is already fully loaded. However, objects such as animations, videos, and audio wave sounds do not fully load in response to the load invocation in block 100, which was discussed above. These objects may be loaded only to the extent required to instantiate the objects onto the page. For example, in FIG. 9B, if the author has selected either the "on play" or "stream" buffer options, radio buttons 206 or 208, most of the data for these types of objects will remain on the CD-ROM after "load" is invoked for the objects. However, the present invention will enable as much of the data for such objects to be loaded into RAM as possible in the background, during available system cycles, before the objects are required to play on the current page.

Figure 6:
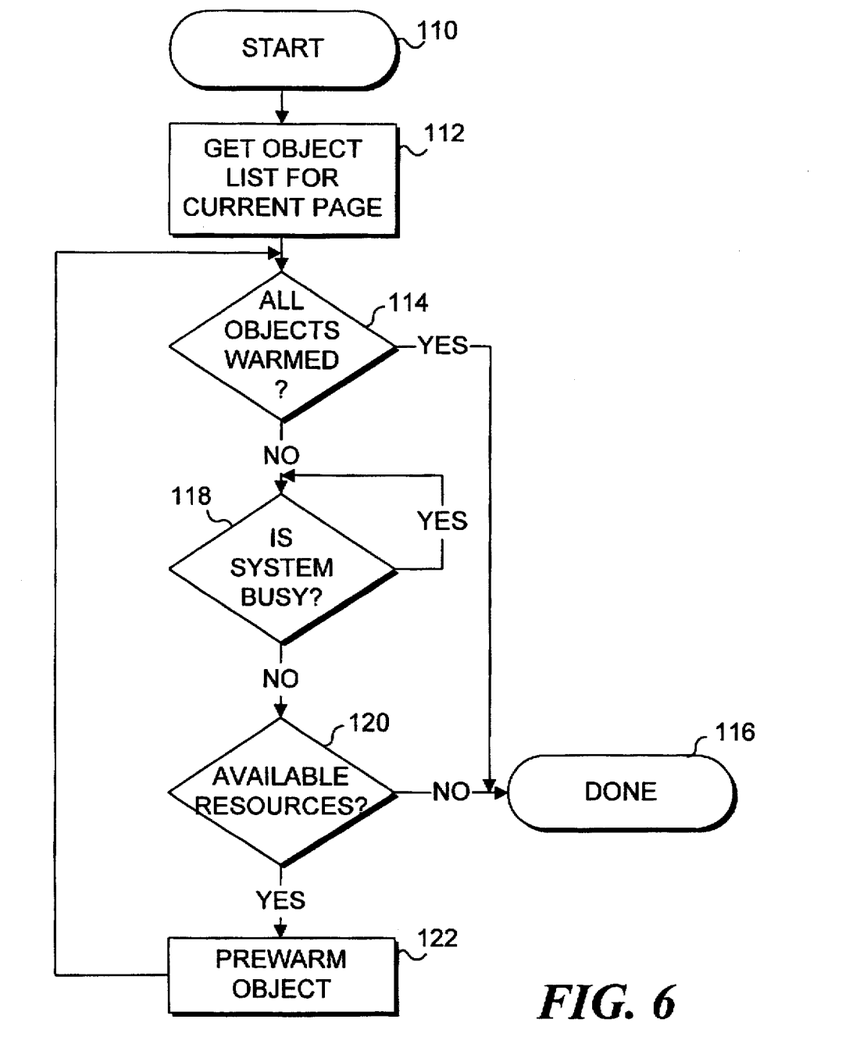
FIG. 6 is a flow chart showing the logical steps effected in prewarming data for an object.

FIG. 6 illustrates the steps involved in prewarming objects on a current page beginning with a start block 110. In a block 112, the logic obtains the object list that is registered for the current page. As noted above, this list identifies each of the objects associated with the current page. A decision block 114 determines if all objects in the list of objects have been prewarmed, and if so, the logic proceeds to a block 116, which concludes the object prewarming process. If not, the logic proceeds to a decision block 118, which determines if the system, i.e., the CPU, is busy with other tasks. If so, the logic continues to loop until the CPU is free. In some cases, it is possible that there will be no free CPU cycles available to prewarm an object that has not fully loaded into RAM before the object is required to be executed. In this case, the object will not be prewarmed and when it is required, there will be a delay in transferring the data required to execute the object from the CD-ROM to the memory of the personal computer. It is also possible that only a portion of the data necessary to execute an object will have been loaded into the RAM of the personal computer in the prewarming invocation, before the object is required to execute. If so, there will be a delay while the remainder of the data loads from the CD-ROM.

If free CPU cycles are available for prewarming the object, a decision block 120 next determines if there are available resources for prewarming. For example, in this step, the system will determine if caching has been enabled and if cache space is available for prewarming the object. If not, the object prewarming process is concluded in block 116. Assuming that resources are available, a block 122 provides for prewarming the object by loading as much of the data required to execute the object as can be accomplished in the background during the available free cycles of the CPU. Any other task that the CPU must execute interrupts the prewarming of the object, returning the logic to decision block 118. Although the loop back to the decision block is not shown, it will be understood that data for the object is prewarmed until all or as much of the data as possible are loaded or until the object is executed. Prewarming an object typically requires a number of CPU cycles. Once the current object is prewarmed, i.e., fully loaded (or the object is executed), the logic proceeds back to a block 114 to determine if all objects on the active page have been prewarmed.

Figure 10:
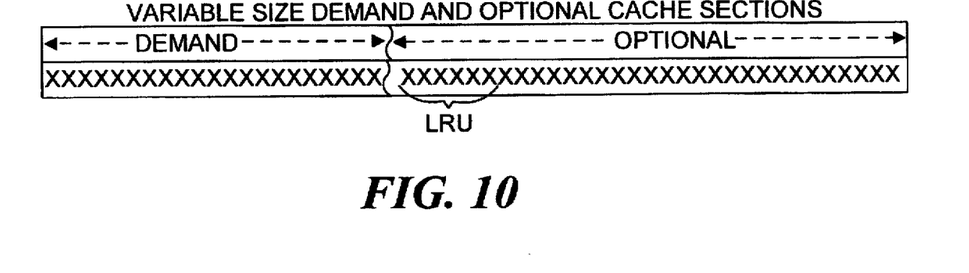
FIG. 10 graphically illustrates a cache that is divided into a demand section and an optional section, for storing data transferred from the CD-ROM.

When a page and/or objects on a page are prewarmed, the data for the page and/or objects are transferred from the CD-ROM into a cache. Therefore, prewarming does not occur unless the author has enabled the caching of data. The preferred embodiment uses a cache that comprises two parts, generally as shown in FIG. 10. In this FIG., the left portion of the cache is identified as a demand section, while the right portion is identified as an optional section. The demand section represents the portion of the total cache that is required for temporarily storing the data necessary to instantiate a page (and the objects on it) as the page opens on the monitor. In contrast, the optional section of the cache is used for temporarily storing other data, including the data that are loaded to prewarm the subsequent pages, or to prewarm objects on a page that is currently being played.

The concept of caching data should be distinguished from simply buffering data. Although caching can be selectively turned off by the author of a multimedia work in Symmetry, a buffer will nevertheless always be provided for temporary storage of data transferred from a CD-ROM to instantiate a new page before that page actually appears on the monitor. Caching enables the data used on a page to be retained for more than one page so that the data are again immediately available when next required. For example, the data required for an object appearing on a page that will also be used in two or three subsequent pages should be cached. If the data for the object are not cached, it will be necessary to repetitively load the data into RAM from the CD-ROM each time that the object is executed. However, by caching the data, the object can be immediately executed without incurring any delay for reloading the object's data.

The relationship between the cache shown in FIG. 10, and prewarming pages and objects is discussed in further detail in connection with the flow chart of FIG. 7. Following a start block 150, a block 152 provides for shifting the data that are in the demand section of the cache to the optional section. In fact, data are not actually "shifted." Instead, the point dividing the demand section and the optional section is simply shifted to the extreme left, so that the entire cache comprises the optional section. This step sets up the cache to start a new demand section for the next page and occurs each time that a page changes during the play of the multimedia work.

In a block 154, the data for instantiating a new page is loaded from the CD-ROM into the demand section of the cache. A block 156 provides for getting the object list for the new page, generally as described above in connection with prewarming pages and objects. In a decision block 158, the logic determines if all objects on the current page have been processed and if so, proceeds to a decision block 160. Decision block 160 determines if caching for the multimedia work has been enabled by the author. If not, the data are simply being loaded into a page buffer (rather than a true cache), and this cache does not store the data for more than one page transition. Accordingly, a block 162 provides for purging the optional section of the cache, which effectively deletes all of the data from the previous page that were shifted into the optional section of the cache in block 152. However, if caching was enabled by the author, the logic proceeds to a block 164, which terminates the transfer of data for the current page.

Referring back to decision block 158, if all objects have not yet been processed, the logic proceeds to a decision block 166. In decision block 166, the system determines whether the data for the current object have already been loaded into the optional section of the cache. If not, the data for the object are transferred from the CD-ROM, as provided in a block 168. Further, as indicated in a block 170, the data for the object are loaded into the tail portion of the demand section. As viewed in FIG. 10, the tail portion of the demand section is the right-most side of that section, i.e., adjacent to the interface between the demand and optional sections.

Figure 7:
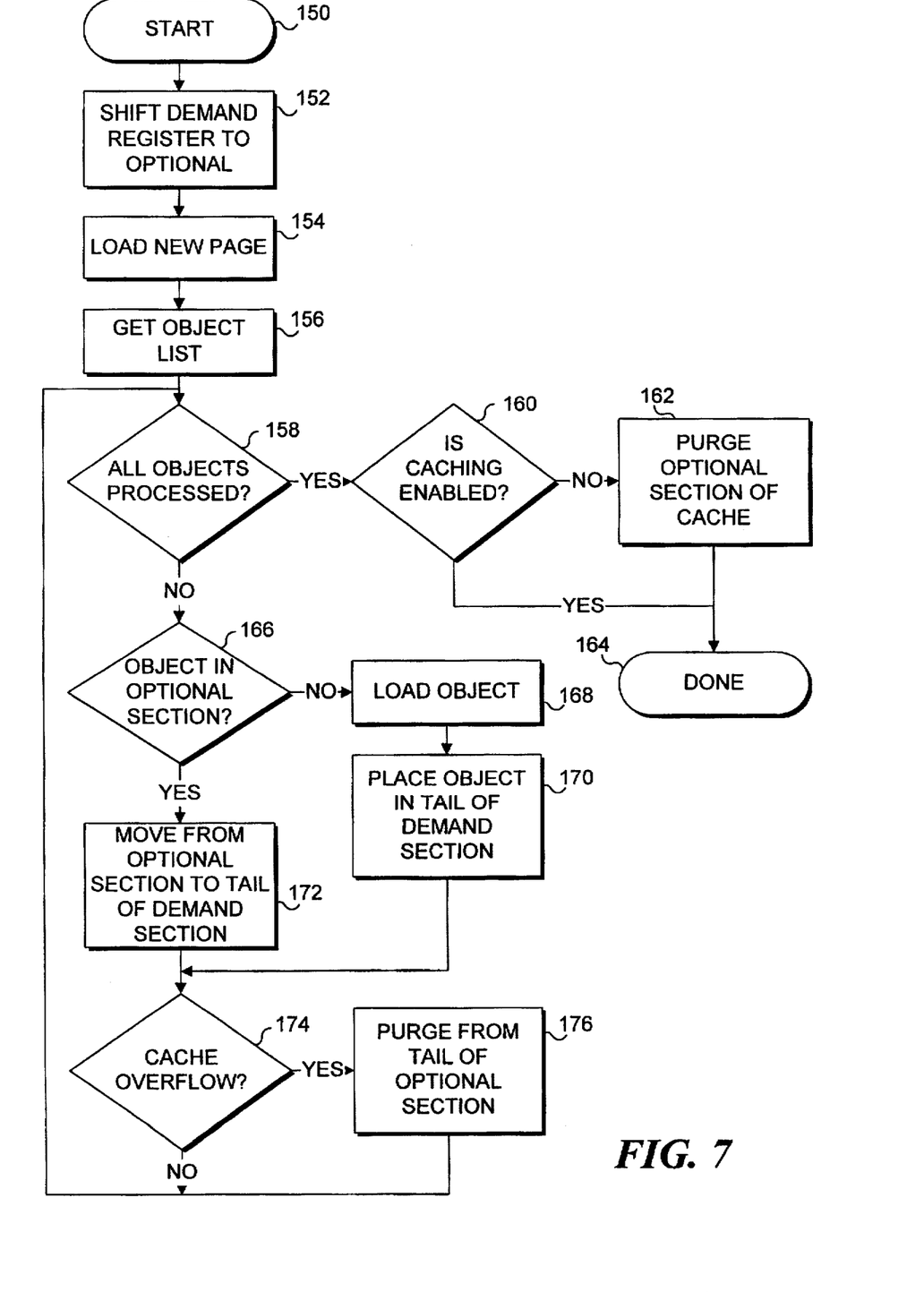
FIG. 7 is a flow chart showing how the data for a page change is handled in a cache.

Referring back to decision block 166 in FIG. 7, if the object has been loaded into the optional section, the system proceeds to a block 172, which moves the data for the current object from the optional section to the tail of the demand section of the cache. This step simply involves shifting the interface between the demand and the optional sections toward the right, since the data for the current object that are in the optional section will be in the left-most portion of the optional section. Data in this part of the optional section are for the least recently used (LRU) object.

A decision block 174 then determines if the cache has exceeded its maximum size. As explained below, the author can determine a maximum size for the cache. The maximum size determined by the author only affects the amount of data that can be stored in the optional section, since the demand section can use the entire cache and can be larger than the maximum size determined by the author. Assuming that the maximum size has been exceeded in decision block 174, a block 176 provides for purging data from the tail of the optional section, which is to the right as shown in FIG. 10. Only data for objects that are not prewarmed can be purged. Thereafter, or if the cache is less than its maximum size, the logic returns to block 158 to process the next object. Processing continues in this manner until all objects for the current page have been processed.

Figure 8:
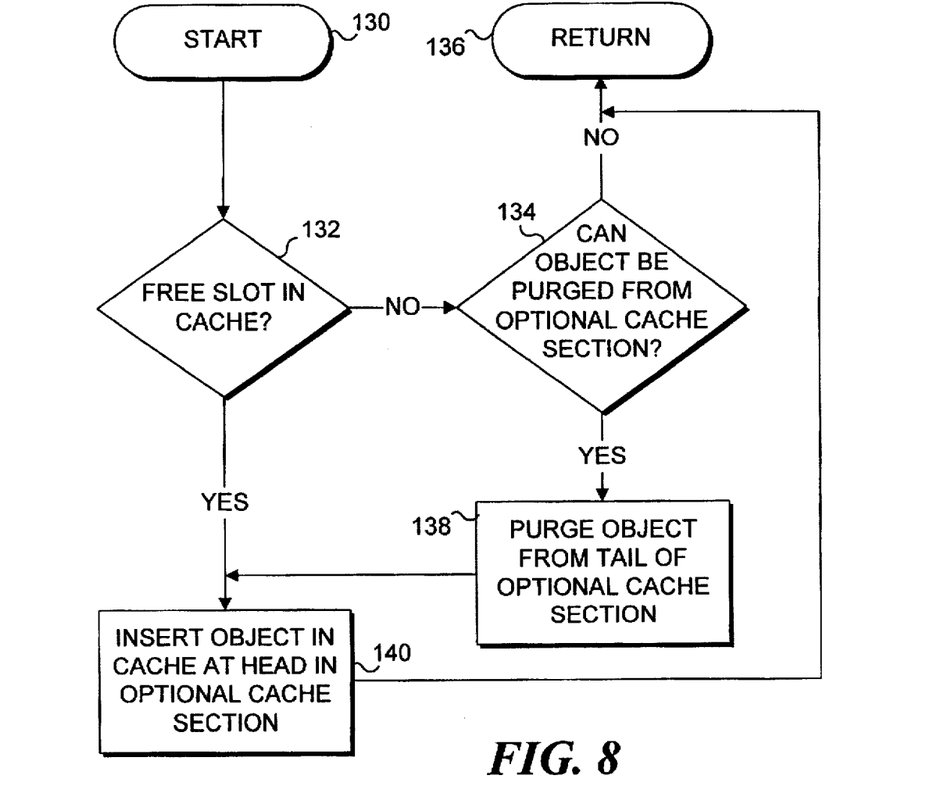
FIG. 8 is a flow chart showing how the data for objects are handled in a cache during prewarming.

In FIG. 8, the steps involved in prewarming an object by transferring data into the cache are illustrated, beginning at a block 130. In a decision block 132, the system determines if a free slot exists in the cache for loading data for the object. This inquiry is directed to the optional section of the cache where data for objects are prewarmed. If there is no free slot in the cache, a decision block 134 determines if the data for an object in the optional section of the cache can be purged. Assuming that the data for an object cannot be purged from the cache, the data for the object that is being prewarmed cannot be loaded, and in a block 136, the system simply returns to the main program to continue executing other aspects of the multimedia work.

Alternatively, if data can be purged from the cache, a block 138 purges the object data from the tail of the optional cache section. In other words, data for one of the objects, stored at the far right-hand side of the optional section shown in FIG. 10, are deleted. Subsequently, the logic proceeds to a block 140, which inserts the data for the current object that is being prewarmed into the cache at the head of the optional cache section. Thereafter, the system continues to a block 136, returning back to the program to process further objects or to continue executing other aspects of the multimedia work.

Figure 9A:
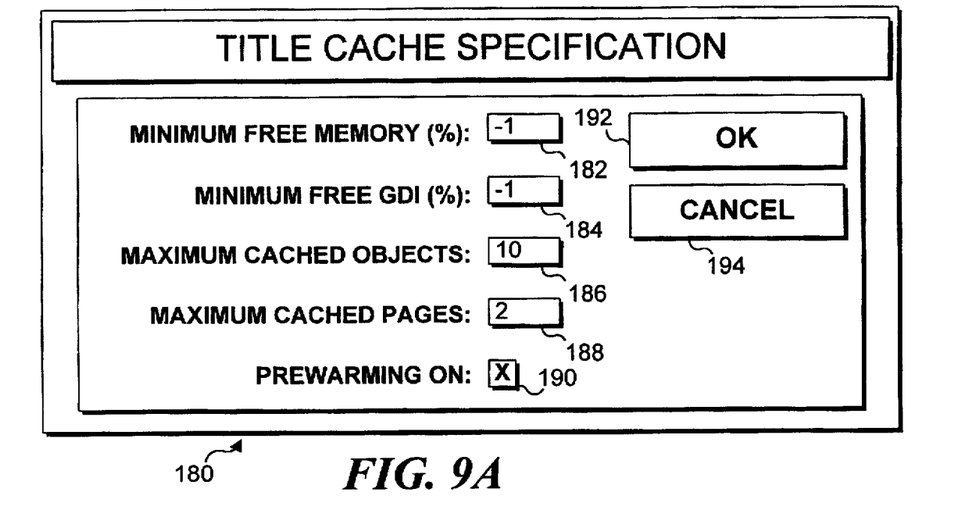
FIG. 9A is a cache specification dialog provided to enable the author of a multimedia work to set parameters related to caching object and page data for the work.

FIG. 9A illustrates a dialog that enables the author of the multimedia work to set parameters that impact on the manner in which the system handles prewarming of pages and objects. In a dialog 180 entitled Title Cache Specification, the author is enabled to set parameters that affect caching for the entire multimedia work. For example, in a box 182, a default value (−1) is entered to indicate the Minimum Free Memory (%) that is to be maintained. Unless the author changes the default value to a specific percentage, caching is enabled for the data used to define objects on a page. In a box 184, the user can indicate the Minimum Free Graphic Device Interface (GDI) (%). Once again, the default value is −1. By setting a specific percentage value for this parameter in box 184, the author can control the percentage of the GDI resources that must be maintained free at a minimum. Boxes 186 and 188 respectively enable the user to enter the maximum number of cached objects and maximum number of cached pages. In the example shown in FIG.

9A, the author has entered 10 in box 186 and 2 in box 188, indicating that up to ten objects can be cached. Similarly, the 2 entered in box 188 indicates that up to two pages can be cached. The values entered in these two blocks (if not −1) are logically ANDed together to determine the size of the optional cache section for caching objects and pages. In other words, if either value is reached, the cache is considered to be full. In addition, a box 190 is provided to enable the author to determine whether prewarming is allowed for any objects or pages within the multimedia work. Box 190 must be checked in order to enable prewarming of any page or object in the multimedia work. Once the author has set the parameters in dialog 180, an "OK" button 192 can be selected to enter the parameters or a "CANCEL" button 194 can be depressed to cancel the selection.

When the maximum number of cached objects has been exceeded, data for objects that are the least recently used are removed from the cache to make room for new objects. Similarly, when the maximum number of pages specified by the author have been exceeded, the data for pages that are the least recently used are removed from memory to make room for the data for new pages. Data for pages and objects are maintained in the same cache. Each time that data for a new page are loaded into the cache, the system first checks to determine if any of the constraints specified by the author has been exceeded, and if so, first removes page descriptions and then data for objects to return the total to no more than the specified maximum.

Assuming that the author has enabled caching and prewarming in dialog 180, a menu item in SYMMETRY can be selected to enable the author to indicate specific pages in the multimedia work that should be prewarmed to produce the page prewarming list associated with a page and also for indicating the objects on the pages that should be prewarmed. Perhaps the most important use for prewarming is in connection with animations, as will be evident from the example presented above. However, at times, it may be necessary to turn off prewarming for an animation if the prewarming process seems to interfere with the smooth execution of other objects that are already playing. For this reason, although not shown, menu items in the SYMMETRY application enable the author to select the objects on a page that are prewarmed, and to indicate the pages that are to be prewarmed.

Figure 9B:
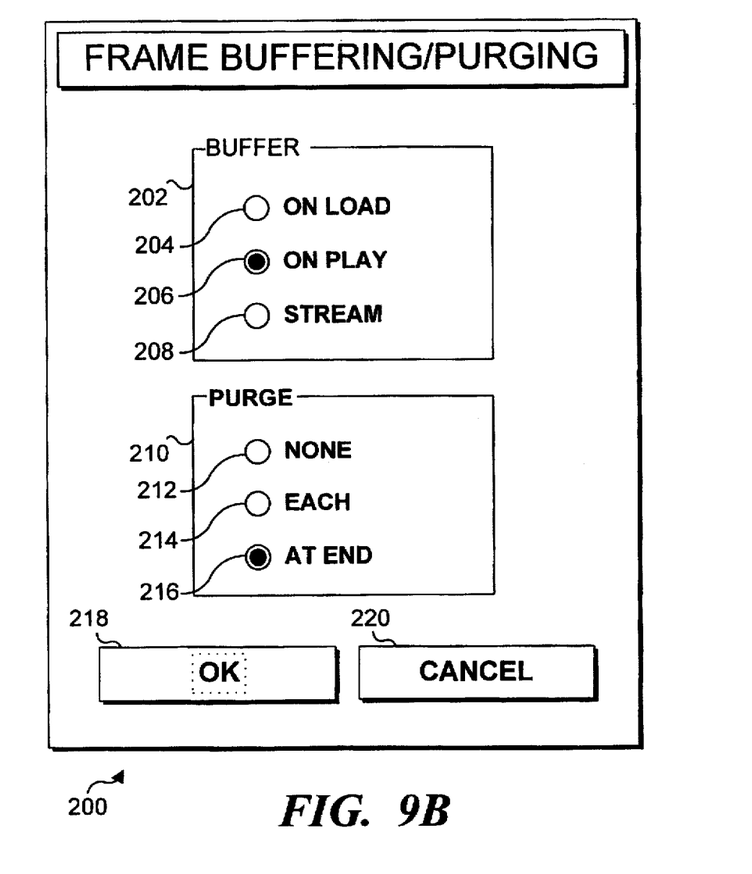
FIG. 9B is a frame buffering/purging dialog in which the author can select from among various options that control the buffering of data for animations and the purging of objects from a cache.

In FIG. 9B, a dialog 200 shows how the author can set frame buffering options that may impact on the benefits of prewarming an object. In a buffering section 202, radio buttons 204, 206, and 208 enable the author to respectively set On Load, On Play, or Stream buffering, respectively, in a buffer section 202. When the On Load buffer option is selected, the data for an object are fully loaded when the page that includes the object is loaded, so that prewarming of the object becomes somewhat meaningless. However, if the object will be buffered On Play or Stream, the present invention may provide a benefit by invoking prewarming of the object. Radio buttons 212, 214, and 216 in a purge section 210 of dialog box 200 are directed to options that are not relevant to the present invention. An OK button 218 and a Cancel button 220 provide the indicated functions.

While the present invention has been described in connection with its use for transferring data from a CD-ROM for pages and objects of a multimedia work, it should be apparent that the present invention can also be used in other applications that involve efficient transfer of data while other aspects of a program are executing. So long as free CPU cycles are available to handle the transfer of data in the background, the system will have the data available in memory when needed without pausing to transfer the data in the foreground. This technique can provide a substantial advantage in improving the efficiency with which data are transferred for almost any application.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for transferring data from a storage medium to the memory of a computer, the data being divided into discrete portions, each of which is used by a central processor of the computer to perform a different defined task, said method comprising the steps of:
   (a) transferring a first discrete portion of the data from the storage medium to the memory of the computer when initiating execution of the defined task for which the first discrete portion of the data is used; and
   (b) prior to initiating use of the first discrete portion of the data by the central processor of the computer and during times when the central processor of the computer is not needed for executing any other task, transferring a second discrete portion of the data that will subsequently be used by the computer for a different defined task, from the storage medium to the memory of the computer, so that at least a part of said second discrete portion of the data is already stored in the memory of the computer for use prior to said data being needed for executing the defined task for which the second discrete portion of the data is used.

2. The method of claim 1, wherein the memory of the computer comprises a cache that includes a demand section and an optional section, said demand section initially being loaded with data from the storage medium that are needed by the central processor to instantiate the first and the second portions of the data, and said optional section being initially loaded with the first discrete portion of the data and subsequently loaded with at least a part of the second discrete portion of the data while the central processor is not needed for executing any other tasks.

3. The method of claim 2, further comprising the step of shifting said at least part of the second discrete portion of the data from the optional section into the demand section.

4. The method of claim 2, further comprising the step of enabling a user to determine parameters that affect a maximum size of the cache.

5. The method of claim 4, wherein the demand section can exceed the maximum size of the cache determined by the user if necessary to load parts of the discrete portions of the data required by the central processor.

6. The method of claim 1, further comprising the step of enabling a user to specify specific discrete portions of the data that will be loaded into the computer memory when the central processor is not needed for executing any other task.

7. The method of claim 1, wherein the discrete portions of the data define at least one of a page and an object of a multimedia work stored on a CD-ROM, and wherein the steps of transferring comprise the steps of reading the discrete portions of the data for said at least one of the page and the object from the CD-ROM; and transferring the discrete portions of the data into a cache accessible by the central processor.

8. A method for transferring data for different objects from a CD-ROM to a computer RAM for use in executing the objects to minimize delays when playing a portion of a multimedia work with a central processor of a computer, comprising the steps of:
   (a) transferring the data for a first object from the CD-ROM to the computer RAM;
   (b) before beginning to execute the first object with the central processor and during times when the central processor is not needed for executing any other task, prewarming a second object that will subsequently be executed by the central processor, by transferring the data for the second object from the CD-ROM to the computer RAM only when no other task is interrupted or delayed by the transfer of the data; and
   (c) beginning to execute the first object and the second object with the central processor when play of the first and the second objects is respectively initiated in the multimedia work, said central processor being thus enabled to execute said second object substantially without incurring a delay in the execution of the first object that would otherwise have been incurred to transfer the data for the second object from the CD-ROM, and being enabled to instantiate the first object and the second object, and carry out other tasks without first transferring all of the data for the second object from the CD-ROM to the computer memory.

9. The method of claim 8, further comprising the step of enabling an author of the multimedia work to designate objects that are to be prewarmed.

10. The method of claim 8, wherein the multimedia work comprises a plurality of pages, said pages each comprising at least one object, and wherein the computer memory comprises a cache for buffering the data for the objects, further comprising the step of enabling an author to determine a maximum size for the cache.

11. The method of claim 10, further comprising the step of enabling a user to select specific pages on which the data for at least one object will be prewarmed by transfer to the computer memory from the CD-ROM when the central processor is otherwise inactive.

12. The method of claim 10, wherein the cache comprises a demand section and an optional section, said demand section being initially loaded with a portion of the data for the objects on a page, said portion of the data being that required to instantiate said objects when said page of the multimedia work is initially opened by the computer.

13. The method of claim 12, wherein the demand section of the cache can exceed the maximum size of the cache determined by the author.

14. The method of claim 12, wherein the step of transferring the data for the second object comprises the step of loading the data for the second object into the optional section of the cache from the CD-ROM.

15. The method of claim 14, further comprising the step of shifting the data for the second object from the optional section of the cache to the demand section of the cache when the central processor changes pages.

16. The method of claim 12, further comprising the steps of enabling an author of the multimedia work to select other objects for prewarming; and transferring data into the optional section of the cache for the other objects on a page that are selected for prewarming during times that the central processor is not needed to execute any other task.

17. The method of claim 16, wherein the data for any object that are already in the demand section are not transferred into the optional section of the cache from the CD-ROM.

18. The method of claim 16, wherein the optional section has a head end and a tail end, further comprising the step of shifting data for an object that will be called for execution on the current page to the head of the optional section, wherein said data have previously been transferred into the optional section from the CD-ROM.

19. A system for transferring discrete sections of data from a storage device, so as to minimize delays in using the discrete sections of the data when each discrete section is needed to perform part of a task, comprising:
   a computer that uses the discrete sections of data, different discrete sections of the data being used by the computer at different times to perform the part of the task associated therewith, said computer including:
   (a) a central processor that executes machine instructions to carry out functions performed by the computer;
   (b) a memory that is used to store data for programs executing on the computer and to store the machine instructions that control the computer in executing said programs; and
   (c) an interface that couples the computer to the storage device, enabling the computer to access and transfer related sections of data from the storage device to the memory in order to execute the task, said central processor responding to machine instructions that cause one section of the data to be transferred to the memory initially to initiate said task, and thereafter, when the central processor is not needed for executing any other function, prewarming another section of the data by transferring the other section of data to the memory, so that the other section of the data is subsequently available for use by the central processor before needed to perform the part of said task associated therewith, to minimize any delay in executing the task that would otherwise be incurred in order to transfer the other section of data.

20. The system of claim 19, wherein the storage device comprises a CD-ROM, and wherein the interface comprises a CD-ROM drive and control circuit.

21. The system of claim 20, wherein the related sections of data comprise a multimedia work, each section of data defining at least one of a page and an object, said one of the page and the object being executed when the multimedia work is played by the computer.

22. The system of claim 19, wherein the memory comprises RAM and ROM, said related sections of data being transferred to a cache provided in the RAM by the central processor.

23. The system of claim 22, wherein the cache includes a demand section that stores portions of the data that are initially required to instantiate the data for use and an optional section that stores portions of the data that are subsequently required when executing the data, at least some of the data transferred from the storage device during the free cycles of the central processor being stored in the optional section of the cache by the central processor.

24. An article of manufacture, adapted for use by a computer to control caching of data loaded into a memory of the computer, wherein said data are divided into a plurality of discrete portions, each portion of the data being used for a different defined task, said article of manufacture comprising:
   a memory medium on which are stored a plurality of machine instructions, said machine instructions, when implemented on a computer, controlling the transfer of data from a storage device into the memory of the computer, so that:

(a) a first discrete portion of the data is transferred from the storage device to the memory of the computer when beginning execution of a defined task that requires the data; and (b) prior to initiating the use of the first discrete portion of the data by the computer and during any free system cycles when the computer is not needed for executing any other functions, transferring at least a part of a second discrete portion of the data that will subsequently be used by the computer to perform a defined task for which the second discrete portion is used, from the storage device to the memory of the computer, so that said second discrete portion of the data is already stored in the memory of the computer for use by the computer when needed in executing the defined task for which the second discrete portion of the data is used.

25. The article of manufacture of claim 24, wherein the memory of the computer includes a cache having a demand section and an optional section, said demand section initially being loaded with data from the storage device that are needed to instantiate the first and the second portions of the data, and said optional section being initially loaded with the first discrete portion of the data and subsequently loaded with at least part of the second discrete portion of the data during any free system cycles in which the central processor is free from executing other tasks.

26. The article of manufacture of claim 25, wherein the machine instructions provide for shifting said at least part of the second discrete portion of the data from the optional section into the demand section of the cache.

27. The article of manufacture of claim 25, wherein the machine instructions enable a user to determine parameters that affect a maximum size of the cache.

28. The article of manufacture of claim 27, wherein the demand section can exceed the maximum size of the cache determined by the user if necessary to load parts of the discrete portions of the data required for execution of the task by the computer.

29. The article of manufacture of claim 24, wherein the machine instructions enable a user to specify specific discrete portions of the data that will be loaded into the memory during any free system cycles of the computer.

30. The article of manufacture of claim 24, wherein the discrete portions of the data define at least one of a page and an object of a multimedia work stored on the storage device.

31. A method for storing data used in performing a plurality of successive tasks on a computer, said data being recorded on a storage device, comprising the steps of:

(a) providing a cache in a memory of the computer, said cache including a demand section and an optional section;

(b) initially loading said demand section of the cache with data transferred from the storage device that are required to initiate a first task of the plurality of successive tasks; and (c) loading said optional section of the cache with data transferred from the storage device that will subsequently be used for performing a second task of the plurality of successive tasks.

32. The method of claim 31, further comprising the step of shifting the data from the optional section into the demand section after performing the first task.

33. The method of claim 31, further comprising the step of enabling a user to determine parameters that affect a maximum size of the cache.

34. The method of claim 33, wherein the demand section of the cache can exceed the maximum size of the cache determined by the user if necessary to store the data required for the completing the first task.

35. The method of claim 31, wherein data used for performing other successive tasks are transferred from the storage device to the optional section of the cache if said data are not already in the demand section of the cache.

36. An article of manufacture adapted to be employed on a computer for storing data used in performing a plurality of successive tasks on a computer, said data being stored on a storage device, comprising:

a memory medium for storing machine instructions that are executable on the computer, said machine instructions providing for:

(a) creating a cache in a memory of the computer, said cache including a demand section and an optional section;

(b) initially loading said demand section of the cache with data from a storage device that are required to initiate a first task of the plurality of successive tasks; and (c) loading said optional section of the cache with data from the storage device that will subsequently be used for performing a second task of the plurality of successive tasks.

37. The article of manufacture of claim 36, wherein the machine instructions further provide for shifting the data from the optional section into the demand section after performing the first task.

38. The article of manufacture of claim 36, wherein the machine instructions further provide for enabling a user to determine parameters that affect a maximum size of the cache.

39. The article of manufacture of claim 38, wherein the demand section of the cache can exceed the maximum size of the cache determined by the user if necessary to store the data required for the completing the first task.

40. The article of manufacture of claim 36, wherein data used for performing other successive tasks are transferred from the storage device to the optional section of the cache if said data are not already in the demand section of the cache.

* * * * *

UNITED STATES PATENT AND TRADEMARK OFFICE
CERTIFICATE OF CORRECTION

PATENT NO. : 5,732,267
DATED : March 24, 1998
INVENTOR(S) : Matthew W. Smith

It is certified that error appears in the above-indentified patent and that said Letters Patent is hereby corrected as shown below:

| | |
|---|---|
| Title page, Item [56], Other Publications, 2nd Reference | "Dis10" should read --Disk-- |
| Column 1, line 56 | "bf" should read --of-- |
| Column 2, line 5 | "thatis" should read --that is-- |
| Column 4, line 16 | "inchdes" should read --includes-- |
| Column 6, line 9 | "mn" should read --run-- |
| Column 6, line 23 | "flames" should read --frames-- |
| Column 6, line 28 | "inchdes" should read --includes-- |
| Column 7, line 28 | "prewarreed" should read --prewarmed-- |
| Column 7, line 51 | "prewarreed" should read --prewarmed-- |
| Column 10, line 62 | "-1.By" should read -- -1. By-- |
| Column 11, line 49 | "On" should read --On-- |
| Column 12, line 59 (Claim 6, line 4) | "processo.r" should read --processor-- |

Signed and Sealed this

Fifteenth Day of September, 1998

Attest:

BRUCE LEHMAN

*Attesting Officer*    *Commissioner of Patents and Trademarks*